(12) United States Patent
Minami et al.

(10) Patent No.: US 11,965,222 B2
(45) Date of Patent: Apr. 23, 2024

(54) METHOD FOR PRODUCING HOT-ROLLED STEEL SHEET AND METHOD FOR PRODUCING COLD-ROLLED FULL HARD STEEL SHEET

(71) Applicant: JFE Steel Corporation, Tokyo (JP)

(72) Inventors: Hidekazu Minami, Tokyo (JP); Yoshimasa Funakawa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 760 days.

(21) Appl. No.: 17/158,097

(22) Filed: Jan. 26, 2021

(65) Prior Publication Data

US 2021/0147957 A1   May 20, 2021

Related U.S. Application Data

(62) Division of application No. 16/087,468, filed as application No. PCT/JP2017/008956 on Mar. 7, 2017, now Pat. No. 10,941,461.

(30) Foreign Application Priority Data

Mar. 31, 2016  (JP) ................................. 2016-070748
Nov. 30, 2016  (JP) ................................. 2016-232542

(51) Int. Cl.
| | |
|---|---|
| C21D 9/46 | (2006.01) |
| B32B 15/01 | (2006.01) |
| B32B 15/04 | (2006.01) |
| B32B 15/18 | (2006.01) |
| C21D 6/00 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/10 | (2006.01) |
| C22C 38/12 | (2006.01) |
| C22C 38/14 | (2006.01) |

(Continued)

(52) U.S. Cl.
CPC ............... *C21D 9/46* (2013.01); *B32B 15/01* (2013.01); *B32B 15/013* (2013.01); *B32B 15/04* (2013.01); *B32B 15/043* (2013.01); *B32B 15/18* (2013.01); *C21D 6/001* (2013.01); *C21D 6/002* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0273* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *C23C 2/00* (2013.01); *C23C 2/04* (2013.01); *C23C 2/06* (2013.01); *C23C 2/12* (2013.01); *C23C 2/28* (2013.01); *C23C 2/40* (2013.01); *C23C 30/00* (2013.01); *C23C 30/005* (2013.01); *C25D 5/50* (2013.01); *C25D 7/0614* (2013.01); *Y10T 428/12757* (2015.01); *Y10T 428/12799* (2015.01); *Y10T 428/12951* (2015.01); *Y10T 428/12972* (2015.01)

(58) Field of Classification Search
CPC .. C21D 8/0236; C21D 8/0226; C21D 8/0205; C21D 6/005; C21D 9/46
See application file for complete search history.

(56) References Cited

U.S. PATENT DOCUMENTS

| | | | |
|---|---|---|---|
| 7,806,993 B2 | 10/2010 | Miyazaki et al. | |
| 9,587,297 B2 | 3/2017 | Ishii et al. | |

(Continued)

FOREIGN PATENT DOCUMENTS

| | | |
|---|---|---|
| EP | 2998415 A1 | 3/2016 |
| JP | 61124533 A | 6/1986 |

(Continued)

OTHER PUBLICATIONS

International Search Report and Written Opinion for International Application No. PCT/JP2017/008956, dated Jun. 13, 2017, 5 pages.

(Continued)

*Primary Examiner* — Jessee R Roe
(74) *Attorney, Agent, or Firm* — Buchanan Ingersoll & Rooney PC

(57) ABSTRACT

A method of producing a hot-rolled steel sheet and a method for producing a cold-rolled full hard steel sheet are provided. The methods comprising heating a steel slab having a composition containing, in terms of mass %, C: 0.010% or more and 0.150% or less, Si: 0.20% or less, Mn: 1.00% or less, P: 0.100% or less, S: 0.0500% or less, Al: 0.001% or more and 0.100% or less, N: 0.0100% or less, and the balance being Fe and unavoidable impurities, in which $0.002\% \leq [\% P]+[\% S] \leq 0.070\%$ ([% M] denotes a content (mass %) of M element in steel) is satisfied.

4 Claims, No Drawings

(51) Int. Cl.
| | |
|---|---|
| C22C 38/16 | (2006.01) |
| C22C 38/18 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/30 | (2006.01) |
| C22C 38/32 | (2006.01) |
| C22C 38/40 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/54 | (2006.01) |
| C22C 38/60 | (2006.01) |
| C23C 2/00 | (2006.01) |
| C23C 2/04 | (2006.01) |
| C23C 2/06 | (2006.01) |
| C23C 2/12 | (2006.01) |
| C23C 2/28 | (2006.01) |
| C23C 2/40 | (2006.01) |
| C23C 30/00 | (2006.01) |
| C25D 5/50 | (2006.01) |
| C25D 7/06 | (2006.01) |

(56) References Cited

U.S. PATENT DOCUMENTS

| | | | |
|---|---|---|---|
| 10,272,513 | B2 | 4/2019 | Hirasawa et al. |
| 10,385,431 | B2 | 8/2019 | Minami et al. |
| 10,450,625 | B2 | 10/2019 | Fukuda et al. |
| 10,458,013 | B2 | 10/2019 | Fukuda et al. |
| 2016/0186283 | A1 | 6/2016 | Minami et al. |

FOREIGN PATENT DOCUMENTS

| | | | |
|---|---|---|---|
| JP | 02267227 | A | 11/1990 |
| JP | 07216459 | A | 8/1995 |
| JP | 2004346430 | A | 12/2004 |
| JP | 2009197293 | A | 9/2009 |
| JP | 2015081359 | A | 4/2015 |
| JP | 2015096648 | A | 5/2015 |
| JP | 2015151600 | A | 8/2015 |
| WO | 2015015739 | A1 | 2/2015 |
| WO | 2016015738 | A1 | 2/2015 |

OTHER PUBLICATIONS

Non Final Office Action for U.S. Appl. No. 16/325,575, dated Sep. 11, 2020, 17 pages.
Entire patent prosecution history of U.S. Appl. No. 16/087,468, filed Sep. 21, 2018, entitled, "Steel Sheet, Coated Steel Sheet, Method for Producing Hot-Rolled Steel Sheet, Method for Producing Cold-Rolled Full Hard Steel Sheet, Method for Producing Steel Sheet, and Method for Producing Coated Steel Sheet."

METHOD FOR PRODUCING HOT-ROLLED STEEL SHEET AND METHOD FOR PRODUCING COLD-ROLLED FULL HARD STEEL SHEET

CROSS REFERENCE TO RELATED APPLICATIONS

This application is a divisional of U.S. patent application Ser. No. 16/087,468, filed Sep. 21, 2018, now U.S. Pat. No. 10,941,961, which is a U.S. National Phase application of PCT/JP2017/008956, filed Mar. 7, 2017, which claims priority to Japanese Patent Application No. 2016-070748, filed Mar. 31, 2016 and Japanese Patent Application No. 2016-232542, filed Nov. 30, 2016, the disclosure of each of these applications being incorporated herein by reference in their entireties for all purposes.

FIELD OF THE INVENTION

The present invention relates to a steel sheet, a coated steel sheet, a method for producing a hot-rolled steel sheet, a method for producing a cold-rolled full hard steel sheet, a method for producing a steel sheet, and a method for producing a coated steel sheet.

BACKGROUND OF THE INVENTION

Cold-rolled steel sheets are used as the raw material for various structures due to their good formability. Typically, cold-rolled steel sheets are press-formed into three-dimensional structures. Furthermore, three-dimensional structures are often joined with one another to form a complicated three-dimensional structure. Thus, cold-rolled steel sheets are required to have excellent workability.

Patent Literature 1 proposes one example of a cold-rolled steel sheet having excellent workability, which is a high-workability cold-rolled steel sheet having low C, Mn, Al, and N contents and being prepared by a production method that involves cold-rolling a steel sheet at a rolling reduction ratio of 50% or more and then regulating the cooling conditions and the overaging conditions after annealing while also regulating the skinpass rolling reduction ratio.

Patent Literature 2 discloses a method for producing a cold-rolled steel sheet having excellent workability, the method including continuously casting a steel with prescribed C, Mn, S, O, and B contents under prescribed conditions, and then performing hot rolling, cold rolling, and continuous annealing.

Patent Literature 3 discloses a technique of producing a cold-rolled steel sheet having excellent workability, the method including hot-rolling and cold-rolling a steel having prescribed C, Si, Mn, P, Al, and N contents, and then quickly heating and quickly cooling the resulting rolled sheet during continuous annealing.

PATENT LITERATURE

PTL 1: Japanese Unexamined Patent Application Publication No. 61-124533
PTL 2: Japanese Unexamined Patent Application Publication No. 2-267227
PTL 3: Japanese Unexamined Patent Application Publication No. 7-216459

SUMMARY OF THE INVENTION

However, according to the production method described in Patent Literature 1, the increase in skinpass rolling reduction ratio cannot be avoided, and degradation of workability due to skinpass rolling cannot be avoided.

According to the production method described in Patent Literature 2, although the size of MnS is controlled through oxide inclusions, 60 ppm or more of oxygen must be contained. Thus, large quantities of oxide inclusions occur, and, in press-forming, cracking occurs from the inclusions as the starting points.

According to the production method described in Patent Literature 3, the heat transfer in the steel cannot be made uniform throughout the entire steel sheet, and the workability is improved only in some part of the steel sheet.

Moreover, although all of the patent literatures disclose that ductility is particularly excellent among various properties related to workability, the planar anisotropy of YP is not considered. Moreover, the surface properties of the steel sheet are not considered.

The present invention has been developed under the above-described circumstances, and an object thereof is to provide a steel sheet and a coated steel sheet that have a tensile strength (TS) of 340 MPa or more, excellent workability, excellent YP planar anisotropy, and excellent surface properties, and methods for producing the steel sheet and the coated steel sheet. Another object is to provide a method for producing a hot-rolled steel sheet and a method for producing a cold-rolled full hard steel sheet necessary for obtaining the steel sheet and coated steel sheet.

For the purposes of the present invention, excellent workability means that the product, TS×El (El denotes the total elongation), is 13000 MPa·% or more. Moreover, excellent YP planar anisotropy means that the value of the index of the planar anisotropy of YP, |ΔYP|, is 30 MPa or less. Here, |ΔYP| is determined by formula (1) below:

$$|\Delta YP| = (YPL - 2 \times YPD + YPC)/2 \tag{1}$$

where YPL, YPD, and YPC respectively represent values of YP measured from JIS No. 5 test pieces taken in three directions, namely, the rolling direction (L direction) of the steel sheet, a direction (D direction) 45° with respect to the rolling direction of the steel sheet, and a direction (C direction) 90° with respect to the rolling direction of the steel sheet, by a tensile test in accordance with the description of JIS Z 2241 (2011) at a crosshead speed of 10 mm/min.

Excellent surface properties means that the length incidence of the scale defects per 100 coils is 0.8% or less. (The "scale defects" means that the scale remaining during descaling during the hot-rolling step remains in the finish rolling step and the subsequent steps, and forms defects that degrade the surface properties. Examples of the scale defects include red scale and bite scale).

The inventors of the present invention have conducted extensive studies to obtain a steel sheet that has a TS of 340 MPa or more, excellent workability, excellent YP planar anisotropy, and excellent surface properties, and a method for producing the steel sheet, and have found the following.

By adding particular amounts or more of P and S having an excellent descaling property, the surface properties of the steel sheet can be improved. Moreover, the YP planar anisotropy can be decreased by controlling cold-rolling and the heating rate in the recrystallization temperature range during the heating process in annealing and by controlling the ferrite recrystallized texture. In addition, ductility can be improved by appropriately controlling the overaging temperature and by controlling cementite to precipitate in the grain boundaries of ferrite.

On the basis of the findings described above, it has become possible to produce a steel sheet that has a TS of 340

MPa or more, excellent workability, excellent YP planar anisotropy, and excellent surface properties.

The present invention has been made on the basis of the above-described findings. In other words, the summary of the features according to exemplary embodiments of the present invention is as follows.

[1] A steel sheet having: a composition containing, in terms of mass %, C: 0.010% or more and 0.150% or less, Si: 0.20% or less, Mn: 1.00% or less, P: 0.100% or less, S: 0.0500% or less, Al: 0.001% or more and 0.100% or less, N: 0.0100% or less, and the balance being Fe and unavoidable impurities, in which 0.002%≤[% P]+[% S]≤0.070% ([% M] denotes a content (mass %) of M element in steel) is satisfied; a steel structure in which ferrite has an average crystal grain size of 5 μm or more and 25 μm or less, 40% or more of cementite in terms of area fraction is precipitated in ferrite grain boundaries, and the ferrite has a texture in which an inverse intensity ratio of γ-fiber to α-fiber is 0.8 or more and 7.0 or less; and a tensile strength of 340 MPa or more.

[2] The steel sheet described in [1], wherein the composition further contains, in terms of mass %, at least one element selected from: Ti: 0.001% or more and 0.100% or less, Nb: 0.001% or more and 0.100% or less, V: 0.001% or more and 0.100% or less, B: 0.0001% or more and 0.0050% or less, Cr: 0.01% or more and 1.00% or less, Mo: 0.01% or more and 0.50% or less, Cu: 0.01% or more and 1.00% or less, Ni: 0.01% or more and 1.00% or less, As: 0.001% or more and 0.500% or less, Sb: 0.001% or more and 0.200% or less, Sn: 0.001% or more and 0.200% or less, Ta: 0.001% or more and 0.100% or less, Ca: 0.0001% or more and 0.0200% or less, Mg: 0.0001% or more and 0.0200% or less, Zn: 0.001% or more and 0.020% or less, Co: 0.001% or more and 0.020% or less, Zr: 0.001% or more and 0.020% or less, and REM: 0.0001% or more and 0.0200% or less.

[3] A coated steel sheet including the steel sheet described in [1] or [2], and a coating layer on a surface of the steel sheet.

[4] A method for producing a hot-rolled steel sheet, the method including heating a steel slab having the composition described in [1] or [2]; rough-rolling the heated steel slab; in subsequent finish rolling, hot-rolling the rough-rolled steel slab under conditions of a finish-rolling inlet temperature of 1020° C. or higher and 1180° C. or lower, a rolling reduction in a final pass of the finish rolling of 5% or more and 15% or less, a rolling reduction in a pass before the final pass of 15% or more and 25% or less, and a finish-rolling delivery temperature of 800° C. or higher and 1000° C. or lower; after the hot rolling, cooling the hot-rolled sheet to a coiling temperature at an average cooling rate of 5° C./s or more and 90° C./s or less; and coiling the cooled sheet at a coiling temperature of 400° C. or higher and 800° C. or lower.

[5] A method for producing a cold-rolled full hard steel sheet, the method including pickling a hot-rolled steel sheet obtained in the method described in [4]; and performing cold-rolling at a rolling reduction of 55% or more, wherein, when a rolling reduction in a final pass of cold rolling is assumed to be $R_F$ and rolling reductions one stand, two stands, and three stands before the final pass are respectively assumed to be $R_{F-1}$, $R_{F-2}$, and $R_{F-3}$, the rolling reductions $R_{F-1}$, $R_{F-2}$, and $R_{F-3}$ are each set to 10% or more and 35% or less, a difference ($|R_{F-1} - R_{F-2}|$) between the rolling reduction one stand before the final pass and the rolling reduction two stands before the final pass is set to 10% or less, and a difference ($|R_{F-2} - R_{F-3}|$) between the rolling reduction two stands before the final pass and the rolling reduction three stands before the final pass is set to 10% or less.

[6] A method for producing a steel sheet, the method including heating, in a continuous annealing furnace, a cold-rolled full hard steel sheet, which is obtained in the method described in [5], while setting a dew point to −40° C. or lower in a temperature range of 600° C. or higher and setting an average heating rate to 50° C./s or less in a temperature range of 450° C. to T1 temperature−10° C.; holding the sheet in a temperature range of the T1 temperature or higher and a T2 temperature or lower; cooling the heated sheet to an overaging temperature; and then performing an overaging process at a temperature of 300° C. or higher and 550° C. or lower, where:

$$T1 \text{ temperature } (° C.) = 735 + 29 \times [\% \text{ Si}] - 21 \times [\% \text{ Mn}] + 17 \times [\% \text{ Cr}]$$

$$T2 \text{ temperature } (° C.) = 960 - 203 \times [\% \text{ C}]^{1/2} + 45 \times [\% \text{ Si}] - 30 \times [\% \text{ Mn}] + 150 \times [\% \text{ Al}] - 20 \times [\% \text{ Cu}] + 11 \times [\% \text{ Cr}] + 350 \times [\% \text{ Ti}] + 104 \times [\% \text{ V}]$$

where in the formulae above, [% X] denotes a content (mass %) of a component element X in the steel sheet, and 0 is indicated when the element is not contained.

[7] The method for producing a steel sheet described in [6], in which the cooling to the overaging temperature is performed by water cooling.

[8] A method for producing a steel sheet, the method including heating and holding a cold-rolled full hard steel sheet, which is obtained in the method described in [5], to and in a temperature range of 600° C. or higher and 750° C. or lower in a box annealing furnace while setting a dew point to −40° C. or lower in a temperature range of 600° C. or higher.

[9] A method for producing a coated steel sheet, the method including coating the steel sheet obtained in the method described in any one of [6] to [8].

A steel sheet and a coated steel sheet obtained according to embodiments by the present invention have a TS of 340 MPa or more, excellent workability, excellent YP planar anisotropy, and excellent surface properties. When the steel sheet and the coated steel sheet according to embodiments of the present invention are applied to, for example, automobile structural elements, fuel efficiency can be improved through car body weight reduction, and thus the present invention offers considerable industrial advantages.

Furthermore, the method for producing a hot-rolled steel sheet and the method for producing a cold-rolled full hard steel sheet according to an embodiment of the present invention serve as the methods for producing intermediate products for obtaining the steel sheet and the coated steel sheet with excellent properties described above and contribute to improving the properties of the steel sheet and the coated steel sheet described above.

DETAILED DESCRIPTION OF EMBODIMENTS OF THE INVENTION

The embodiments of the present invention will now be described. It should be understood that the present invention is not limited to the following embodiments.

The present invention provides a steel sheet, a coated steel sheet, a method for producing a hot-rolled steel sheet, a method for producing a cold-rolled full hard steel sheet, a method for producing a steel sheet, and a method for producing a coated steel sheet. First, how these relate to one another is described.

A steel sheet according to embodiments of the present invention also serves as an intermediate product for obtaining a coated steel sheet of the present invention. A coated steel sheet according to an embodiment of the present invention is prepared from a steel material, such as a slab, and obtained by going through the processes of producing a hot-rolled steel sheet, a cold-rolled full hard steel sheet, and a steel sheet. The steel sheet according to embodiments of the present invention is the steel sheet used in the above-described process.

The method for producing a hot-rolled steel sheet according to embodiments of the present invention is the method that covers up to obtaining a hot-rolled steel sheet in the process described above.

The method for producing a cold-rolled full hard steel sheet according to embodiments of the present invention is the method that covers up to obtaining a cold-rolled full hard steel sheet from a hot-rolled steel sheet in the process described above.

The method for producing a steel sheet according to embodiments of the present invention is the method that covers up to obtaining a steel sheet from a cold-rolled full hard steel sheet in the process described above.

The method for producing a coated steel sheet according to embodiments of the present invention is the method that covers up to obtaining a coated steel sheet from a steel sheet in the process described above.

Since such a relationship exists, the compositions of the hot-rolled steel sheet, the cold-rolled full hard steel sheet, the steel sheet, and the coated steel sheet are common, and the steel structures of the steel sheet and the coated steel sheet are common. In the description below, the common features, the steel sheet, the coated steel sheet, and the production methods therefor are described in that order.

<Composition>

The steel sheet etc., according to embodiments of the present invention have a composition containing, in terms of mass %, C: 0.010% or more and 0.150% or less, Si: 0.20% or less, Mn: 1.00% or less, P: 0.100% or less, S: 0.0500% or less, Al: 0.001% or more and 0.100% or less, N: 0.0100% or less, and the balance being Fe and unavoidable impurities, in which $0.002\% \leq [\% \text{ P}] + [\% \text{ S}] \leq 0.070\%$ is satisfied ([% M] denotes a content (mass %) of an M element in the steel).

The composition may further contain, in terms of mass %, at least one element selected from Ti: 0.001% or more and 0.100% or less, Nb: 0.001% or more and 0.100% or less, V: 0.001% or more and 0.100% or less, B: 0.0001% or more and 0.0050% or less, Cr: 0.01% or more and 1.00% or less, Mo: 0.01% or more and 0.50% or less, Cu: 0.01% or more and 1.00% or less, Ni: 0.01% or more and 1.00% or less, As: 0.001% or more and 0.500% or less, Sb: 0.001% or more and 0.200% or less, Sn: 0.001% or more and 0.200% or less, Ta: 0.001% or more and 0.100% or less, Ca: 0.0001% or more and 0.0200% or less, Mg: 0.0001% or more and 0.0200% or less, Zn: 0.001% or more and 0.020% or less, Co: 0.001% or more and 0.020% or less, Zr: 0.001% or more and 0.020% or less, and REM: 0.0001% or more and 0.0200% or less.

The individual components will now be described. In the description below, "%" that indicates the content of the component means "mass %".

C: 0.010% or More and 0.150% or Less

C either forms cementite in the steel or exists in a solid solution state. At a C content less than 0.010%, precipitation driving force of solid solution C is decreased, cementite precipitation is inhibited, and the strength is degraded. Thus, the C content is to be 0.010% or more. More preferably, the C content is 0.030% or more. At a C content exceeding 0.150%, the amount of cementite is increased, the number of void-generation sites at the cementite-ferrite interfaces increases during working, and the elongation of the steel sheet is degraded. Thus, the C content is to be 0.150% or less. The C content is preferably 0.130% or less and more preferably 0.120% or less.

Si: 0.20% or Less

Si is an element that suppresses generation of cementite, and suppresses cementite formation from C. Thus, at a Si content exceeding 0.20%, the sites where cementite precipitates are no longer controlled, and cementite is likely to emerge inside ferrite grains. Meanwhile, at a Si content exceeding 0.20%, the descaling property and the pickling property (descalability) are degraded, and the surface properties are deteriorated. Thus, the Si content is to be 0.20% or less. The Si content is preferably 0.10% or less and more preferably 0.05% or less. In an embodiment of the present invention, the Si content is usually 0.01% or more.

Mn: 1.00% or Less

Manganese (Mn) does not form a compound with C, but Mn and C attract each other in the steel, and diffusion of C is suppressed. Thus, incorporation of Mn suppresses generation of cementite in grain boundaries, and deteriorates workability. Thus, in the present invention, the content of Mn is preferably reduced as with Si. Thus, the Mn content is to be 1.00% or less. The Mn content is preferably 0.80% or less and more preferably 0.70% or less. In the present invention, the Mn content is usually 0.10% or more.

P: 0.100% or Less

Phosphorus (P) segregates in ferrite grain boundaries, suppresses precipitation of cementite in the ferrite grain boundaries, and thereby deteriorates the workability. Thus, the P content is to be 0.100% or less. The P content is preferably 0.060% or less, more preferably 0.050% or less, and yet more preferably 0.040% or less. In the present invention, the P content is usually 0.001% or more and preferably 0.003% or more.

S: 0.0500% or Less

Sulfur (S) is an element that bonds with Mn to form MnS. When the S content is large, a large amount of MnS is generated and obstructs grain growth of ferrite grains, the ferrite grains become fine as a result, and the workability is deteriorated. Thus, in an embodiment of the present invention, the S content is to be 0.0500% or less. The S content is preferably 0.0300% or less and more preferably 0.0200% or less. In the present invention, the S content is usually 0.0010% or more.

Al: 0.001% or More and 0.100% or Less

Aluminum (Al) is an important element in an embodiment of the present invention. Although Al itself does not form carbides, Al promotes removing C from the inside of the ferrite grains and promotes formation of cementite in the grain boundaries. In order to obtain these effects, the Al content needs to be at least 0.001%. Preferably, the Al content is 0.005% or more. As a result, workability is improved. However, at an Al content exceeding 0.100%, Al bonds with fine AlN and oxygen (O), which is an unavoidable impurity, to form fine oxides and makes ferrite grains finer, thereby deteriorating the workability. Thus, the Al content is to be 0.100% or less. Thus, the Al content is to be in the range of 0.001% or more and 0.100% or less. The lower limit of the Al content is preferably 0.005% or more, and the upper limit of the Al content is preferably 0.100% or less and more preferably 0.070% or less.

N: 0.0100% or Less

Nitrogen (N) bonds with Al to form AlN. When B is added, N forms BN. When the N content is large, a large amount of nitrides occur and obstruct grain growth of ferrite grains, the ferrite grains become fine as a result, and the workability is deteriorated. Thus, in an embodiment of the present invention, the N content is set to be 0.0100% or less. The N content is preferably 0.0080% or less and more preferably 0.0070% or less. In the present invention, the N content is usually 0.0010% or more.

The steel sheet etc., of the present invention may contain, in addition to the composition described above, in terms of mass %, at least one element selected from Ti: 0.001% or more and 0.100% or less, Nb: 0.001% or more and 0.100% or less, V: 0.001% or more and 0.100% or less, B: 0.0001% or more and 0.0050% or less, Cr: 0.01% or more and 1.00% or less, Mo: 0.01% or more and 0.50% or less, Cu: 0.01% or more and 1.00% or less, Ni: 0.01% or more and 1.00% or less, As: 0.001% or more and 0.500% or less, Sb: 0.001% or more and 0.200% or less, Sn: 0.001% or more and 0.200% or less, Ta: 0.001% or more and 0.100% or less, Ca: 0.0001% or more and 0.0200% or less, Mg: 0.0001% or more and 0.0200% or less, Zn: 0.001% or more and 0.020% or less, Co: 0.001% or more and 0.020% or less, Zr: 0.001% or more and 0.020% or less, and REM: 0.0001% or more and 0.0200% or less. These elements are preferably contained alone or in combination.

Titanium (Ti) is an element effective for fixing N, which induces aging degradation, by forming TiN. This effect is obtained by setting the Ti content to 0.001% or more. Meanwhile, at a Ti content exceeding 0.100%, TiC is excessively generated in the hot rolling stage, the amount of carbides generated inside the ferrite grains increases, and, thus, deformation of ferrite is suppressed and the workability is degraded. Thus, if Ti is to be added, the Ti content is set within a range of 0.001% or more and 0.100% or less, and the lower limit is preferably 0.005% or more. The upper limit is preferably 0.050% or less.

Niobium (Nb) forms fine precipitates during hot-rolling or annealing, and increases the strength. Niobium also reduces the size of grains during hot-rolling, and accelerates recrystallization of ferrite, which contributes to decreasing the YP planar anisotropy, during cold-rolling and the subsequent annealing. In order to obtain these effects, the Nb content needs to be 0.001% or more. Meanwhile, at a Nb content exceeding 0.100%, composite precipitates, such as Nb—(C, N) are excessively generated, the amount of carbides generated inside the ferrite grains increases, and, thus, deformation of ferrite is suppressed and the workability is degraded. Thus, if Nb is to be added, the Nb content is set within a range of 0.001% or more and 0.100% or less. The lower limit of the Nb content is preferably 0.005% or more. The upper limit of the Nb content is preferably 0.050% or less.

Vanadium (V) can increase the strength of steel by forming carbides, nitrides, or carbonitrides. In order to obtain this effect, the V content needs to be 0.001% or more. Meanwhile, when the V content is excessively large, TiC is excessively generated in the hot rolling stage, the amount of carbides generated inside the ferrite grains increases, and, thus, deformation of ferrite is suppressed and the workability is degraded. Thus, if V is to be added, the V content is set within a range of 0.001% or more and 0.100% or less. The lower limit of the V content is preferably 0.005% or more and more preferably 0.010% or more. The upper limit of the V content is preferably 0.080% or less and more preferably 0.070% or less.

Boron (B) bonds with N to form BN and can suppress precipitation of fine AlN. Since BN precipitates by using MnS as a nucleus, the amount of fine MnS can also be decreased, and as a result, ferrite grain growth can be promoted. The effect of adding B is obtained by setting the B content to 0.0001% or more. However, at a B content exceeding 0.0050%, excess B segregates in the ferrite grain boundaries, and solid solution B suppresses precipitation of cementite in the ferrite grain boundaries, thereby deteriorating the workability. Thus, the B content is to be 0.0050% or less.

Chromium (Cr) is a solid solution strengthening element effective for strengthening the steel, and, in order to obtain this effect, the Cr content needs to be 0.01% or more. Meanwhile, at a Cr content exceeding 1.00%, enhancement of the effect is rarely achieved, coatability is inhibited, and bare spot defects are generated. Thus, if Cr is to be added, the Cr content is set within a range of 0.01% or more and 1.00% or less.

Molybdenum (Mo) is an element effective for strengthening the steel without degrading chemical conversion treatability and coatability. This effect is obtained by setting the Mo content to 0.01% or more. However, at a Mo content exceeding 0.50%, Mo forms coarse carbides and degrades ductility, the amount of inclusions and the like is increased, defects and the like occur in the surface or in the inside, and the ductility is significantly degraded. Thus, the Mo content is set within a range of 0.01% or more and 0.50% or less.

Copper (Cu) is a solid solution strengthening element effective for strengthening the steel, and, in order to obtain this effect, the Cu content needs to be 0.01% or more. However, at a Cu content exceeding 1.00%, the surface layer may crack during hot-rolling, the amount of inclusions and the like increases, defects and the like are thereby formed in the surface or in the inside, and the ductility is significantly degraded. Thus, if Cu is to be added, the Cu content is set within a range of 0.01% or more and 1.00% or less.

Nickel (Ni) contributes to increasing the strength by solid solution strengthening. In order to obtain this effect, the Ni content needs to be 0.01% or more. However, when an excessive amount of Ni is added, the surface layer may crack during hot-rolling, the amount of inclusions and the like increases, the defects and the like are thereby formed in the surface or in the inside, and the ductility is significantly degraded. Thus, if Ni is to be added, the Ni content is set within a range of 0.01% or more and 1.00% or less. The Ni content is preferably 0.50% or less.

Arsenic (As) is an element effective for improving corrosion resistance. In order to obtain this effect, the As content needs to be 0.001% or more. However, if As is added excessively, red shortness is accelerated, the amount of inclusions and the like increases, the defects and the like are thereby formed in the surface or in the inside, and the ductility is significantly degraded. Thus, if As is to be added, the As content is set within a range of 0.001% or more and 0.500% or less.

Antimony (Sb) and tin (Sn) are added as needed from the viewpoint of suppressing decarburization that occurs due to nitriding or oxidizing of the steel sheet surface in a region that spans about several ten micrometers from the steel sheet surface in the sheet thickness direction. Suppressing nitridation and oxidation is effective for improving the surface properties. In order to obtain these effects, the content needs to be 0.001% or more for Sb and for Sn. Meanwhile, if any of these elements is contained in an amount exceeding 0.200%, toughness is degraded. Thus, if Sb and Sn are to be added, the content is set within a range of 0.001% or more and 0.200% or less for each of the elements.

Tantalum (Ta) contributes to increasing the strength by forming alloy carbides and alloy carbonitrides as with Ti and Nb. In addition, Ta is considered to have an effect of partly dissolving in Nb carbides and/or Nb carbonitrides to form composite precipitates such as (Nb, Ta) (C, N) so as to significantly suppress coarsening of precipitates and stabilize the contribution to improving the strength of the steel sheet by precipitation strengthening. Thus, Ta is preferably contained. Here, the effect of stabilizing the precipitates described above is obtained by setting the Ta content to 0.001% or more; however, when Ta is excessively added, the precipitate stabilizing effect is saturated, the amount of inclusions and the like increases, the defects and the like are thereby formed in the surface or in the inside, and the ductility is significantly degraded. Thus, if Ta is to be added, the Ta content is set within a range of 0.001% or more and 0.100% or less.

Calcium (Ca) and magnesium (Mg) are elements used for deoxidization, and also are elements that are effective for making sulfides spherical and alleviating adverse effects of sulfides on ductility, in particular, local ductility. In order to obtain these effects, at least one of these elements needs to be contained in an amount of 0.0001% or more. However, if the amount of at least one element selected from Ca and Mg exceeds 0.0200%, the amount of inclusions and the like increases, the defects and the like are thereby formed in the surface or in the inside, and the ductility is significantly degraded. Thus, if Ca and Mg are to be added, the content is set within a range of 0.0001% or more and 0.0200% or less for each of the elements.

Zinc (Zn), cobalt (Co), and zirconium (Zr) are all an element effective for improving corrosion resistance. In order to obtain this effect, at least one of these elements needs to be contained in an amount of 0.001% or more. However, when the content of at least one of Zn, Co, and Zr exceeds 0.020%, that element segregates in the grain boundaries and obstructs precipitation of cementite in the grain boundaries. Thus, if Zn, Co, and Zr are to be added, the content is set within a range of 0.001% or more and 0.020% or less for each of the elements.

A rare earth metal (REM) is an element effective for improving corrosion resistance. In order to obtain this effect, the REM content needs to be 0.0001% or more. However, when the REM content exceeds 0.0200%, REM segregates in the grain boundaries and obstructs precipitation of cementite in the grain boundaries. Thus, if REM is to be added, the REM content is set within a range of 0.0001% or more and 0.0200% or less.

The balance other than the above-described components is Fe and unavoidable impurities. For optional components (optional elements) described above, if their contents are less than the lower limits, the effects of the present invention are not impaired; thus, when these optional elements are contained in amounts less than the lower limits, these optional elements are deemed to be contained as unavoidable impurities.

Although the components in the composition of the steel sheet are described above, in order to obtain the anticipated effects of the present invention, it is not sufficient to adjust the composition to be within the ranges described above, and it is important to appropriately control the total of the P content and the S content.

That is, the composition needs to satisfy $0.002\% \leq [\% P]+[\% S] \leq 0.070\%$ (where [% M] denotes the content (mass %) of the M element in the steel).

$$0.002\% \leq [\% P]+[\% S] \leq 0.070\%$$

This is an extremely important composition prescription in the embodiments of present invention. Phosphorus (P) and sulfur (S) lower the melting point of the subscale composition since they bring a compositional change in the subscale ($FeO/FeS/P_2O_5$) generated at the scale-base iron interface as the scale is generated in the hot-rolling stage; and thus P and S can improve the descaling property and the pickling property (descalability) in the pickling step. In order to obtain these effects, the total of the P content and the S content needs to be 0.002% or more. Meanwhile, when the total of the P content and the S content exceeds 0.070%, enhancement of the effect is rarely obtained, and, as mentioned above, the workability is degraded. Thus, the total of the P content and the S content is set to be 0.002% or more and 0.070% or less. The lower limit is preferably $0.003\% \leq [\% P]+[\% S]$. The upper limit is preferably $[\% P]+[\% S] \leq 0.060\%$ and more preferably $[\% P]+[\% S] \leq 0.055\%$.

<Steel Structure>

In the steel structure of the steel sheet and the like according to embodiments of the present invention, ferrite has an average crystal grain size of 5 μm or more and 25 μm or less, 40% or more of cementite in terms of area fraction precipitates in ferrite grain boundaries, and the ferrite has a texture in which an inverse intensity ratio of γ-fiber to α-fiber is 0.8 or more and 7.0 or less.

Average crystal grain size of ferrite: 5 μm or more and 25 μm or less

When the average crystal grain size of ferrite is less than 5 μm, the yield stress increases, the elongation decreases, and thus the workability is degraded. Thus, the average crystal grain size is to be 5 μm or more. The average crystal grain size of ferrite is preferably 8 μm or more. However, when the ferrite grain size (average crystal grain size of ferrite) exceeds 25 μm, significant irregularities called orange peel form on the surface during working, and this degrades the workability, deteriorates the appearance quality, and also degrades the strength. Thus, the ferrite grain size is to be 25 μm or less. From the viewpoint of obtaining anticipated properties, the ferrite grain size is preferably 23 μm or less.

The average crystal grain size of ferrite is calculated as follows. That is, the observation position is set to the position of ¼ of the sheet thickness from the surface at a section taken in parallel to the rolling direction, the steel sheet is observed with an optical microscope at a magnification of about 50, and, by using Adobe Photoshop, the total area of the ferrite grains within the observation view area is divided by the number of ferrite grains so as to calculate the average area of the ferrite. The calculated average area is raised to the power of ½, and the result is assumed to be the average crystal grain size of ferrite.

Cementite: 40% or more is precipitated in ferrite grain boundaries

The position where cementite precipitates is important in an embodiment of the present invention. Having cementite in the ferrite grain boundaries decreases the amount of fine cementite present inside the grains, and deformation of ferrite grains can be promoted. When the amount of cementite present in the ferrite grain boundaries is less than 40% of all cementite, fine cementite inside the ferrite grains suppresses deformation of ferrite and degrades the workability. Thus, 40% or more of the sites where cementite has precipitated need to be in the ferrite grain boundaries. Preferably, the percentage is 45% or more.

The amount of the cementite that has precipitated in the ferrite grain boundaries can be determined from the section structure as follows. The observation position is set to the position at ¼ thickness in a sheet-thickness section taken parallel to the rolling direction, and the steel structure is observed at that position. After the section is mirror-polished and cementite is exposed by using a picral corrosive solution, the cementite is observed with an optical microscope (500 magnification). Here, the ratio of the area of cementite that exists in the ferrite grain boundaries to the area of all cementite is assumed to be the ratio of the cementite that exists in the grain boundaries. The phrase "exists in grain boundaries" means cementite appears to be entirely inside the grain boundaries, appears to be partly inside the grain boundaries, or appears to contact the grain boundaries in a microscope image obtained as above.

Inverse intensity ratio of γ-fiber to the α-fiber in ferrite texture: 0.8 or more and 7.0 or less α-Fiber is a fibrous texture whose <110> axis is parallel to the rolling direction, and γ-fiber is a fibrous texture whose <111> axis is parallel to the normal direction of the rolled surface. A body-centered cubic metal is characterized in that α-fiber and γ-fibers strongly develop due to rolling deformation, and the textures that belong to these fibers are formed even if annealing is conducted.

In an embodiment of the present invention, when the inverse intensity ratio of γ-fiber to the α-fiber in the ferrite texture exceeds 7.0, the texture orients in a particular direction of the steel sheet, and the planar anisotropy of mechanical properties, in particular, the planar anisotropy of the YP, is increased. Meanwhile, even when the inverse intensity ratio of γ-fiber to the α-fiber in the ferrite texture is less than 0.8, the planar anisotropy of mechanical properties, in particular, the planar anisotropy of the YP, is also increased. Thus, the inverse intensity ratio of γ-fiber to the α-fiber in the ferrite texture is to be 0.8 or more and 7.0 or less, and the lower limit of the intensity ratio is preferably 2.0 or more and more preferably 2.5 or more. The upper limit of the intensity ratio is preferably 6.5 or less.

In the present invention, the inverse intensity ratio of γ-fiber to the α-fiber in the ferrite texture can be obtained as follows. After a sheet-thickness section (L section) parallel to the rolling direction of the steel sheet is wet-polished and buff-polished with a colloidal silica solution so as to make the surface smooth and flat, the section is corroded with a 0.1 vol.% nital so as to minimize irregularities on the sample surface and completely remove the work-deformed layer. Next, at a position ¼ of the sheet thickness (the position at a depth of ¼ of the sheet thickness from the steel sheet surface), crystal orientation is measured by SEM-EBSD (electron back-scatter diffraction), and the obtained data is analyzed by using OIM analysis available from AMETEK EDAX Company so as to calculate the inverse intensity ratio of γ-fiber to the α-fiber in ferrite.

The steel structure required to obtain the effects according to embodiments of the present invention is as described above; however, typically, in the present invention, 50% or more of ferrite and 5% or more and 40% or less of cementite are contained in terms of area fraction. Other phases may also be contained as long as the effects are not adversely affected.

<Steel Sheet>

The composition and the steel structure of the steel sheet are as described above. The thickness of the steel sheet is not particularly limited but is typically 0.3 mm or more and 2.8 mm or less.

<Coated Steel Sheet>

A coated steel sheet of the present invention is constituted by the steel sheet according to embodiments of the present invention and a coating layer on the steel sheet. The type of the coating layer is not particularly limited, and may be, for example, a hot-dip coating layer or an electrocoating layer. The coating layer may be an alloyed coating layer. The coating layer is preferably a zinc coating layer. The zinc coating layer may contain Al and Mg. A hot-dip zinc-aluminum-magnesium alloy coating (Zn—Al—Mg coating layer) is also preferable. In this case, the Al content is preferably 1 mass % or more and 22 mass % or less, the Mg content is preferably 0.1 mass % or more and 10 mass % or less, and the balance is preferably Zn. In the case of the Zn—Al—Mg coating layer, a total of 1 mass % or less of at least one element selected from Si, Ni, Ce, and La may be contained in addition to Zn, Al, and Mg. The coating metal is not particularly limited, and Al coating and the like may be used in addition to the Zn coating described above. The coating metal is not particularly limited, and Al coating and the like may be used in addition to the Zn coating described above.

The composition of the coating layer is also not particularly limited and may be any typical composition. For example, in the case of a galvanizing layer or a galvannealing layer, typically, the composition contains Fe: 20 mass % or less and Al: 0.001 mass % or more and 1.0 mass % or less, a total of 0 mass % or more and 3.5 mass % or less of one or more elements selected from Pb, Sb, Si, Sn, Mg, Mn, Ni, Cr, Co, Ca, Cu, Li, Ti, Be, Bi, and REM, and the balance being Zn and unavoidable impurities. In the present invention, a galvanizing layer having a coating weight of 20 to 80 $g/m^2$ per side, or a galvannealing layer obtained by alloying this galvanizing layer is preferably provided. When the coating layer is a galvanizing layer, the Fe content in the coating layer is less than 7 mass %, and when the coating layer is a galvannealing layer, the Fe content in the coating layer is 7 to 20 mass %.

<Method for Producing Hot-Rolled Steel Sheet>

A method for producing a hot-rolled steel sheet according to embodiments of the present invention includes heating a steel slab having the above-described composition; hot-rolling the heated slab under conditions of a rolling reduction 5% or more and 15% or less in the final pass of the finish rolling, a rolling reduction of 15% or more and 25% or less in a pass before the final pass, a finish-rolling inlet temperature of 1020° C. or higher and 1180° C. or lower, and a finish-rolling delivery temperature of 800° C. or higher and 1000° C. or lower; after the hot-rolling, cooling to a coiling temperature at an average cooling rate of 5° C./s or more and 90° C./s or less; and coiling the cooled sheet at a temperature of 400° C. or higher and 800° C. or lower. In the description below, the temperature is a steel sheet surface temperature unless otherwise noted. The steel sheet surface temperature can be measured with a radiation thermometer or the like.

In the present invention, the method for melting the steel material (steel slab) is not particularly limited, and any known melting method such as one using a converter or an electric furnace is suitable. The casting method is also not particularly limited, but a continuous casting method is preferable. The steel slab (slab) is preferably produced by a continuous casting method to prevent macrosegregation, but can be produced by an ingot-making method, a thin-slab casting method, or the like. In addition to a conventional method that involves cooling the produced steel slab to room temperature and then re-heating the cooled steel slab, an energy-saving process, such as hot direct rolling, that involves directly charging a hot steel slab into a heating furnace without performing cooling to room temperature or rolling the steel slab immediately after very short recuperation can be employed without any issues. Moreover, the slab is formed into a sheet bar by rough-rolling under standard conditions; however, if the heating temperature is set relatively low, the sheet bar is preferably heated with a bar heater or the like before finish rolling in order to prevent troubles that occur during hot-rolling. In hot-rolling the slab, the slab may be re-heated in a heating furnace and then hot-rolled, or may be heated in a heating furnace at 1250° C. or higher for a short period of time and then hot-rolled.

The steel material (slab) obtained as such is subjected to hot-rolling. In this hot-rolling, only rough rolling and finish rolling may be performed, or only finish rolling may be performed without rough rolling. In either case, the rolling reduction in the final pass of the finish rolling, the rolling reduction in the pass immediately before the final pass, the finish-rolling inlet temperature, and the finish-rolling delivery temperature are important.

Rolling reduction in final pass of finish rolling: 5% or more and 15% or less

Rolling reduction in pass before final pass: 15% or more and 25% or less

In the present invention, when the rolling reduction in the pass before the final pass is set to be equal to or more than the rolling reduction in the final pass, the average crystal grain size of ferrite, the dispersion state of cementite, and the texture can be appropriately controlled. Thus, this feature is extremely important. When the rolling reduction in the final pass of the finish rolling is less than 5%, the ferrite crystal grains coarsen during hot-rolling, the crystal grains thereby coarsen in cold-rolling and subsequent annealing, and thus, the strength is degraded. Moreover, ferrite nucleation and growth occurs from very coarse austenite grains, and thus a so-called duplex-grained structure in which the generated ferrite grains vary in size is created. As a result, grains of a particular orientation grow during recrystallization annealing, resulting in an increase in YP planar anisotropy. Meanwhile, when the rolling reduction in the final pass exceeds 15%, the ferrite crystal grains become finer during hot-rolling, the crystal grains become finer in cold-rolling and subsequent annealing, and thus, the strength is increased. Moreover, as a result of the increase in the percentage of the cementite precipitated inside the ferrite grains, the amount of fine cementite inside the ferrite grains increases, deformation of ferrite is suppressed, and the workability is degraded. Thus, the rolling reduction in the final pass of the finish rolling is set to be 5% or more and 15% or less.

When the rolling reduction in the pass before the final pass is less than 15%, a duplex-grained structure in which the generated ferrite grains vary in size is created despite rolling of the very coarse austenite grains in the final pass, and, as a result, grains of a particular orientation grow during recrystallization annealing, resulting in an increase in YP planar anisotropy. Meanwhile, when the rolling reduction in the pass before the final pass exceeds 25%, the ferrite crystal grains become finer during hot-rolling, the crystal grains become finer in cold-rolling and subsequent annealing, and thus, strength is increased. Moreover, as a result of the increase in the percentage of the cementite precipitated inside the ferrite grains, the amount of fine cementite within the ferrite grains increases, deformation of ferrite is suppressed, and the workability is degraded. Thus, the rolling reduction in the pass before the final pass in the finish annealing is set to be 15% or more and 25% or less.

Finish-rolling inlet temperature: 1020° C. or higher and 1180° C. or lower

The steel slab after heating is hot-rolled through rough rolling and finish rolling so as to form a hot-rolled steel sheet. During this process, when the finish-rolling inlet temperature exceeds 1180° C., the amount of oxides (scale) generated increases rapidly, the interface between the base iron and oxides is roughened, the scale separability during descaling or pickling is degraded, and thus the surface quality after annealing is deteriorated. Moreover, if unseparated hot-rolled scale remains in some parts after pickling, ductility is adversely affected. Meanwhile, at a finish-rolling inlet temperature lower than 1020° C., the finish-rolling temperature after finish-rolling decreases, the rolling load during hot-rolling increases, and the rolling workload increases. Moreover, the rolling reduction while austenite is in an un-recrystallized state is increased, control of the texture after recrystallization annealing becomes difficult, and significant planar anisotropy is generated in the final product, thereby degrading the uniformity and stability of the materials, and ductility itself. Thus, the finish-rolling inlet temperature of hot-rolling needs to be 1020° C. or higher and 1180° C. or lower. Preferably, the temperature is 1020° C. or higher and 1160° C. or lower.

Finish-rolling delivery temperature: 800° C. or higher and 1000° C. or lower

The steel slab after heating is hot-rolled through rough rolling and finish rolling so as to form a hot-rolled steel sheet. During this process, when the finish-rolling delivery temperature exceeds 1000° C., the amount of oxides (scale) generated increases rapidly, the interface between the base iron and oxides is roughened, the scale separability during descaling or pickling is degraded, and thus the surface quality after annealing is deteriorated. Moreover, if unseparated hot-rolled scale remains in some parts after pickling, ductility is adversely affected. In addition, the crystal grains excessively coarsen, and the surface of a press product may become rough during working. Meanwhile, when the finish-rolling delivery temperature is lower than 800° C., the rolling load increases, the rolling workload increases, the rolling reduction while austenite is in an un-recrystallized state increases, an abnormal texture develops, and significant planar anisotropy is generated in the final product. Thus, the uniformity and stability of the materials, and the ductility itself are degraded. At a finish-rolling delivery temperature lower than 800° C., formation of the banded structure increases, and the banded structure remains after annealing and degrades the workability. Thus, the finish-rolling delivery temperature of hot-rolling needs to be 800° C. or higher and 1000° C. or lower. The lower limit of the finish-rolling delivery temperature is preferably 820° C. or higher. The upper limit of the finish-rolling delivery temperature is preferably 950° C. or lower.

As mentioned above, in this hot-rolling, only rough rolling and finish rolling may be performed, or only finish rolling may be performed without rough rolling.

Average cooling rate from after finish-rolling to coiling temperature: 5° C./s or more and 90° C./s or less By appropriately controlling the average cooling rate from after finish-rolling to the coiling temperature, the crystal grains of the phases in the hot-rolled steel sheet can be made finer, and, after the subsequent cold rolling and annealing, cumulation of the texture can be increased in the {111}//ND direction. Here, if the average cooling rate from after finish-rolling to the coiling temperature exceeds 90° C./s, the shape of the sheet is significantly degraded, and problems may arise in the subsequent cold-rolling or annealing (heating and cooling process after cold-rolling). If the average cooling rate is less than 5° C./s, coarse carbides are formed during hot-rolling, and remain even after annealing, which increases the amount of carbides precipitated inside the ferrite grains and thereby degrades workability. Thus, the average cooling rate from after the finish-rolling to the coiling temperature is set to be 5° C./s or more and 90° C./s or less, and the lower limit of the average cooling rate is preferably 7° C./s or more and more preferably 9° C./s or more. The upper limit of the average cooling rate is preferably 60° C./s or less and more preferably 50° C./s or less.

Coiling temperature: 400° C. or higher and 800° C. or lower

When the coiling temperature exceeds 800° C., ferrite grains become coarse, diffusion of C into ferrite grain boundaries does not happen soon enough during overaging, and the workability is deteriorated. Meanwhile, at a coiling temperature lower than 400° C. after hot-rolling, precipitation of nitrides in the hot-rolled sheet is suppressed, and the nitrides form fine precipitates during annealing after cold-rolling, and thereby suppress ferrite grain growth. Thus, the coiling temperature after hot-rolling needs to be 400° C. or higher and 800° C. or lower. The lower limit of the coiling temperature is preferably 500° C. or higher and more preferably 540° C. or higher. The upper limit of the coiling temperature is preferably 750° C. or lower and more preferably 750° C. or lower.

During hot-rolling, rough-rolled sheets may be joined with each other and finish-rolling may be conducted continuously. Moreover, the rough-rolled sheet may be temporarily coiled. Furthermore, in order to decrease the rolling load during hot-rolling, part or the entirety of the finish-rolling may be lubricated. Performing lubricated rolling is also effective from the viewpoints of uniformity of the steel sheet shape and uniformity of the material. The coefficient of friction during lubricated rolling is preferably in the range of 0.10 or more and 0.25 or less.

After the coiling, the steel sheet is cooled by air cooling or the like and used to produce the cold-rolled full hard steel sheet described below. When the hot-rolled steel sheet is treated as the subject of the trade as an intermediate product, typically, the hot-rolled steel sheet that is coiled and then cooled is traded.

<Method for Producing Cold-Rolled Full Hard Steel Sheet>

A method for producing a cold-rolled full hard steel sheet according to an embodiment of the present invention includes pickling the hot-rolled steel sheet described above; and cold-rolling the pickled sheet at a rolling reduction of 55% or more, wherein, when a rolling reduction in a final pass of cold rolling is assumed to be $R_F$ and rolling reductions one stand, two stands, and three stands before the final pass are respectively assumed to be $R_{F-1}$, $R_{F-2}$, and $R_{F-3}$ the rolling reductions $R_{F-1}$, $R_{F-2}$, and $R_{F-3}$ are each set to 10% or more and 25% or less, a difference ($|R_{F-1}-R_{F-2}|$) between the rolling reduction one stand before the final pass and the rolling reduction two stands before the final pass is set to 10% or less, and a difference ($|R_{F-2}-R_{F-3}|$) between the rolling reduction two stands before the final pass and the rolling reduction three stands before the final pass is set to 10% or less.

Pickling can remove oxides on the steel sheet surface, and thus is extremely important for ensuring excellent chemical conversion treatability and coating quality of the final products, such as steel sheets and coated steel sheets. Pickling may be performed once, or in fractions several times.

Rolling reduction (rolling reduction ratio) in cold-rolling step: 55% or more

When the rolling reduction in cold-rolling is less than 55%, cementite that has precipitated in the ferrite grain boundaries in the hot-rolled sheet (hot-rolled steel sheet) remains as coarse even after cold-rolling, and is likely to remain as cementite inside the ferrite grains in the cold-rolled annealed sheet (corresponding to the steel sheet), thereby resulting in degraded workability. Cold-rolling causes the α-fiber and the γ-fiber to develop and thereby increases the amount of ferrite having the α-fiber and the γ-fiber, in particular, ferrite having the γ-fiber, in a structure after annealing, and, thus, the YP planar anisotropy can be decreased. Thus, the lower limit of the rolling reduction for cold-rolling is set to be 55%. The upper limit of the rolling reduction is not particularly limited, but, from the industrial viewpoint, is about 95%.

Rolling reduction one stand before final pass of cold-rolling, and rolling reductions two stands and three stands before final pass: each 10% or more and 35% or less In the present invention, the average crystal grain size of ferrite, the dispersion state of cementite, and the texture can be appropriately controlled by controlling the rolling reductions one stand, two stands, and three stands before the final pass of the cold-rolling to 10% or more and 35% or less each. Thus, the cold-rolling conditions are extremely important. When the rolling reductions one stand, two stands, and three stands before the final pass of the cold-rolling are each less than 10%, a shear band is not evenly introduced during cold-rolling, and thus, grain growth varies during recrystallization annealing, resulting in formation of a duplex-grained structure composed of ferrite grains that vary in size. As a result, the planar anisotropy of YP is increased. Meanwhile, when the rolling reductions one stand, two stands, and three stands before the final pass of the cold-rolling each exceed 35%, the crystal grain size is reduced during annealing, and the strength is increased. Moreover, as a result of the increase in the percentage of the cementite precipitated inside the ferrite grains, the amount of fine cementite inside the ferrite grains increases, deformation of ferrite is suppressed, and the workability is degraded. Thus, the rolling reductions one stand, two stands, and three stands before the final pass of cold-rolling are each to be 10% or more and 35% or less.

Difference ($|R_{F-1}-R_{F-2}|$) between rolling reduction one stand before final pass of cold-rolling and rolling reduction two stands before the final pass: 10% or less (including 0%)

Difference ($|R_{F-2}-R_{F-3}|$) between rolling reduction two stand before final pass of cold-rolling and rolling reduction three stands before the final pass: 10% or less (including 0%)

In the present invention, the average crystal grain size of ferrite, the dispersion state of cementite, and the texture can be appropriately controlled by controlling, to 10% or less each, the difference between the rolling reduction one stand before the final pass of the cold-rolling and the rolling reduction two stands before the final pass and the difference between the rolling reduction two stands before the final pass and the rolling reduction three stands before the final pass. Thus, this condition is one of the extremely important conditions. When one or both of the difference between the rolling reduction one stand before the final pass of the cold rolling and the rolling reduction two stands before the final pass and the difference between the rolling reduction two stands before the final pass and the rolling reduction three stands before the final pass exceed 10%, a shear band is not evenly introduced during cold-rolling, and thus, grain growth varies during recrystallization annealing, resulting in formation of a duplex-grained structure composed of ferrite grains that vary in size. As a result, the planar anisotropy of YP is increased. Thus, the difference between the rolling reduction one stand before the final pass of the cold rolling and the rolling reduction two stands before the final pass and the difference between the rolling reduction two stands before the final pass and the rolling reduction three stands before the final pass are each set to be 10% or less. The difference in rolling reduction is preferably 1% or more in any cases, and more preferably 2% or more.

<Method for Producing a Steel Sheet>

A method for producing a steel sheet by using a continuous annealing furnace and a method for producing a steel sheet by using a box annealing furnace are described separately below. First, the method that uses a continuous annealing furnace is described.

A method for producing a steel sheet according to an embodiment of the present invention includes heating, in a continuous annealing furnace, a cold-rolled full hard steel sheet while setting a dew point to −40° C. or lower in a temperature range of 600° C. or higher and setting an average heating rate to 50° C./s or less in a temperature range of 450° C. to T1 temperature−10° C.; holding the heated sheet in a temperature range of the T1 temperature or higher and a T2 temperature or lower; cooling the heated sheet to an overaging temperature; and then performing an overaging process at a temperature of 300° C. or higher and 550° C. or lower.

Average heating rate in temperature range of 450° C. to T1 temperature−10° C.: 50° C./s or less During heating in continuous annealing, when the average heating rate in the temperature range of 450° C. to T1 temperature−10° C. exceeds 50° C./s, recrystallization of ferrite is insufficient, and the YP planar anisotropy is increased. Meanwhile, if the average heating rate exceeds 50° C./s, the average crystal grain size of ferrite decreases, the yield stress increases, elongation decreases, and thus the workability is degraded. Thus, the average heating rate is to be 50° C./s or less. The average heating rate is preferably 40° C./s or less and more preferably 30° C./s or less. The lower limit of the average heating rate in the temperature range of 450° C. to T1 temperature−10° C. is not particularly limited, but when the average heating rate is less than 0.001° C./s, the crystal grain size of ferrite in the steel sheet increases, and the surface quality may be deteriorated. Thus, the average heating rate is preferably 0.001° C./s or more.

$T1\ \text{temperature}(°\ C.) = 735 + 29 \times [\%\ Si] - 21 \times [\%\ Mn] + 17 \times [\%\ Cr]$

[% X] denotes the mass % of the component element X in the steel sheet, and when that element is not contained, 0 is indicated.

Holding temperature: T1 temperature or higher and T2 temperature or lower

After the heating described above, the sheet is heated to a holding temperature equal to or higher than the T1 temperature and equal to or lower than the T2 temperature under desired heating conditions, and held at that temperature. When the holding temperature (annealing temperature) in continuous annealing is lower than the T1 temperature, recrystallization does not complete, and the ferrite texture cannot be controlled. Moreover, since strain due to cold-rolling remains, workability is degraded. In contrast, at an annealing temperature exceeding the T2 temperature, austenite is generated during annealing, a duplex-grained structure is formed after annealing, the ferrite texture becomes random, and the YP planar anisotropy is increased. Thus, the holding temperature range in annealing is set to be T1 temperature or higher and T2 temperature or lower. Holding may be constant-temperature holding or holding within the above-described temperature range.

$T2\ \text{temperature}\ (°\ C.) = 960 - 203 \times [\%\ C]^{1/2} + 45 \times [\%\ Si] - 30 \times [\%\ Mn] + 150 \times [\%\ Al] - 20 \times [\%\ Cu] + 11 \times [\%\ Cr] + 350 \times [\%\ Ti] + 104 \times [\%\ V]$

[% X] denotes the mass % of the component element X in the steel sheet, and when that element is not contained, 0 is indicated.

The holding time for holding is not particularly limited but is preferably in the range of 10 s or more and 40000 s or less.

After holding, cooling is performed to the overaging temperature. The average cooling rate to the overaging temperature is not particularly limited, but when the average cooling rate is lower than 10° C./s from 680° C. to the overaging temperature, precipitation driving force of cementite is degraded during overaging. Thus, cementite may not precipitate sufficiently and the workability may be deteriorated. Thus, the average cooling rate is preferably 10° C./s or more. The average cooling rate is more preferably 15° C./s or more. This cooling preferably involves water cooling since the precipitation driving force of cementite is increased, and most of the cementite can be effectively precipitated in the ferrite grain boundaries. The upper limit of the average cooling rate is also not particularly limited, and about 350° C./s is sufficient.

Decarburization from the steel sheet surface during annealing can be suppressed by setting the dew point to −40° C. or lower in the temperature range of 600° C. or higher, and thus a tensile strength of 340 MPa or more prescribed in the present invention can be stably achieved. When the dew point in the above-described temperature range exceeds −40° C., decarburization from the steel sheet surface may cause the strength of the steel sheet to be lower than the standard described above. Thus, the dew point in the temperature range of 600° C. or higher is determined to be −40° C. The lower limit of the dew point of the atmosphere is not particularly limited. However, when the dew point is lower than −80° C., the effect is saturated, and this poses a cost disadvantage. Thus, the dew point is preferably −80° C. or higher. The temperature in the temperature ranges described above is based on the steel sheet surface temperature. In other words, the dew point is adjusted to be within the above-described range when the steel sheet surface temperature is within the above-described temperature range.

Overaging temperature range 300° C. or higher and 550° C. or lower

When the temperature during the overaging process is lower than 300° C., cementite is likely to precipitate inside the ferrite grains. Thus, the overaging temperature is set to 300° C. or higher. At a temperature exceeding 550° C., precipitation of cementite becomes difficult. Thus, the temperature during the overaging process is set to be 550° C. or lower. Thus, the overaging temperature range is to be 300° C. or higher and 550° C. or lower. The lower limit of the overaging process temperature is preferably 360° C. or higher. The upper limit of the overaging process temperature is preferably 550° C. or lower.

The process time in the overaging temperature range is not particularly limited, but cementite cannot be sufficiently precipitated if the process time is too short. Thus, the process is preferably performed for 10 seconds or longer or more preferably 1 minute or longer. The effects are not compromised even when the process time is long, but from the limitations related to the production line, 10 minutes is the time industrially feasible.

Box annealing may also be employed instead of continuous annealing. Since box annealing involves gradual heating and gradual cooling, no overaging process is necessary. Moreover, in box annealing, cooling from the annealing temperature takes a long time, and there is a sufficient time for C to diffuse into the ferrite grain boundaries. Thus, the workability is improved.

Holding temperature in box annealing: 600° C. or higher and 750° C. or lower

When box annealing is performed, un-recrystallized portions remain if the holding temperature is lower than 600° C., and coarse grains occur if the holding temperature exceeds 750° C. Thus, the holding temperature is set to be 600° C. or higher and 750° C. or lower.

Although this feature does not limit the present invention, when the holding time is shorter than 1 hour, soaking inside the coil is not attained, and, when the holding time is 40 hours or longer, decarburization occurs from the steel sheet surface during annealing, and the tensile strength of the steel sheet may decrease to below 340 MPa. Thus, the holding time is preferably 1 to 40 hours.

The dew point in the temperature range of 600° C. or higher needs to be −40° C. or lower. The technical significance thereof is the same as that in the method that uses a continuous annealing furnace, and is omitted from the description.

Although the effects of the present invention are not affected, skinpass rolling may be performed after the overaging in continuous annealing or after box annealing. The skinpass rolling ratio is more preferably 0.5% or more and 1.5% or less since at less than 0.5%, the elongation at yield does not disappear, and at a ratio exceeding 1.5%, the steel becomes hard.

When the steel sheet is the subject of the trade, the steel sheet is usually cooled to room temperature, and then traded.

<Method for Producing Coated Steel Sheet>

The method for producing a coated steel sheet according to embodiments of the present invention is the method that involves performing coating on the steel sheet. Examples of the coating process include a galvanizing process, and a galvannealing process. Annealing and galvanizing may be continuously performed using one line. Alternatively, the coating layer may be formed by electroplating, such as Zn—Ni alloy electroplating, or the steel sheet may be coated with hot-dip zinc-aluminum-magnesium alloy. As apparent from the description of the coating layer described above, Zn is preferable, but a coating process that uses other metals, such as Al coating, may be performed.

In performing the galvanizing process, the steel sheet is dipped in a zinc coating bath at 440° C. or higher and 500° C. or lower to galvanize the steel sheet, and the coating weight is adjusted by gas wiping or the like. In galvanizing, a zinc coating bath having an Al content of 0.10 mass % or more and 0.23 mass % or less is preferably used. In performing the galvannealing process, the zinc coating is subjected to an alloying process in a temperature range of 470° C. or higher and 600° C. or lower after galvanizing. When the alloying process is performed at a temperature exceeding 600° C., untransformed austenite transforms into pearlite, and the TS may be degraded. Thus, in performing the galvannealing process, the alloying process is preferably performed in a temperature range of 470° C. or higher and 600° C. or lower. Moreover, an electrogalvanizing process may be performed. The coating weight per side is preferably 20 to 80 g/m² (coating is performed on both sides). The galvannealed steel sheet (GA) is usually subjected to the following alloying process so as to adjust the Fe concentration in the coating layer to 7 to 15 mass %. In the case of typical galvanized steel sheets, the Fe content is less than 7 mass %.

The rolling reduction in skinpass rolling after the coating process is preferably in the range of 0.1% or more and 2.0% or less. At a rolling reduction less than 0.1%, the effect is small and control is difficult; and thus, 0.1% is the lower limit of the preferable range. At a rolling reduction exceeding 2.0%, the productivity is significantly degraded, and thus 2.0% is the upper limit of the preferable range. Skinpass rolling may be performed on-line or off-line. Skinpass may be performed once at a targeted rolling reduction, or may be performed in fractions several times.

Other conditions of the production methods are not particularly limited; however, from the productivity viewpoint, a series of processes such as annealing, galvanizing, galvannealing, etc., are preferably performed in a continuous galvanizing line (CGL). After galvanizing, wiping can be performed to adjust the coating weight. The conditions of the coating etc., other than the conditions described above may be the typical conditions for galvanization.

EXAMPLES

Steels each having a composition indicated in Table 1 with the balance being Fe and unavoidable impurities were melted in a converter, and prepared into slabs by a continuous casting method. The obtained slab was heated under the conditions indicated in Table 2 and hot-rolled, pickled, and cold-rolled under the conditions indicated in Table 2.

Next, Nos. 1 to 15, 17 to 26, and 30 to 37 indicated in Table 2 were subjected to a continuous annealing process so as to obtain high-strength cold-rolled steel sheets (steel sheets). In Nos. 16 and 27 to 29, a box annealing process is performed to obtain high-strength cold-rolled steel sheets. Note that in Nos. 1, 3, 8, 13, 20, 23, 26, 33, and 36, cooling from the annealing temperature to the overaging temperature is performed by water cooling.

Some of the high-strength cold-rolled steel sheets were subjected to a coating process so as to obtain galvanized steel sheets (GI), galvannealed steel sheets (GA), electrogalvanized steel sheets (EG), hot-dip zinc-aluminum-magnesium alloy coated steel sheets (ZAM), etc. A zinc bath with Al: 0.14 to 0.19 mass % was used as the galvanizing bath for GI, and a zinc bath with Al: 0.14 mass % was used for GA. The bath temperature was 470° C. The coating weight was about 45 to 72 g/m² per side (both sides were coated) for GI and about 45 g/m² per side (both sides were coated) for GA. In GA, the Fe concentration in the coating layer was adjusted to 9 mass % or more and 12 mass % or less. In EG with a Zn—Ni coating layer as the coating layer, the Ni content in the coating layer was adjusted to 9 mass % or more and 25 mass % or less. In ZAM with a Zn—Al—Mg coating layer as the coating layer, the Al content in the coating layer was adjusted to 3 mass % or more and 22 mass % or less, and the Mg content was adjusted to 1 mass % or more and 10 mass % or less.

The T1 temperature (° C.) was obtained from the following formula:

$$T1 \text{ temperature (° C.)} = 735 + 29 \times [\% \text{ Si}] - 21 \times [\% \text{ Mn}] + 17 \times [\% \text{ Cr}]$$

The T2 temperature (° C.) can be calculated as follows:

$$T2 \text{ temperature (° C.)} = 960 - 203 \times [\% \text{ C}]^{1/2} + 45 \times [\% \text{ Si}] - 30 \times [\% \text{ Mn}] + 150 \times [\% \text{ Al}] - 20 \times [\% \text{ Cu}] + 11 \times [\% \text{ Cr}] + 350 \times [\% \text{ Ti}] + 104 \times [\% \text{ V}]$$

[% X] denotes the mass % of the component element X in the steel sheet, and when that element is not contained, 0 is indicated.

TABLE 1

| Steel type | Composition (mass %) | | | | | | | | | | | | | | | |
|---|---|---|---|---|---|---|---|---|---|---|---|---|---|---|---|---|
| | C | Si | Mn | P | S | Al | N | P + S | Ti | Nb | V | B | Cr | Mo | Cu | Ni | As |
| A | 0.120 | 0.01 | 0.35 | 0.014 | 0.0085 | 0.044 | 0.0035 | 0.022 | — | — | — | — | — | — | — | — | — |
| B | 0.048 | 0.03 | 0.33 | 0.021 | 0.0044 | 0.027 | 0.0018 | 0.026 | — | — | — | — | — | — | — | — | — |
| C | 0.075 | 0.02 | 0.47 | 0.004 | 0.0084 | 0.040 | 0.0034 | 0.009 | — | — | — | — | — | — | — | — | — |
| D | 0.095 | 0.02 | 0.28 | 0.024 | 0.0100 | 0.009 | 0.0054 | 0.034 | — | — | — | — | — | — | — | — | — |
| E | 0.079 | 0.02 | 0.30 | 0.031 | 0.0067 | 0.038 | 0.0069 | 0.037 | — | — | — | — | — | — | — | — | — |
| F | 0.009 | 0.02 | 0.39 | 0.004 | 0.0033 | 0.045 | 0.0067 | 0.007 | — | — | — | — | — | — | — | — | — |
| G | 0.066 | 0.26 | 0.34 | 0.035 | 0.0119 | 0.037 | 0.0042 | 0.047 | — | — | — | — | — | — | — | — | — |
| H | 0.079 | 0.01 | 1.08 | 0.015 | 0.0138 | 0.044 | 0.0038 | 0.029 | — | — | — | — | — | — | — | — | — |
| I | 0.034 | 0.02 | 0.33 | 0.110 | 0.0054 | 0.020 | 0.0063 | 0.115 | — | — | — | — | — | — | — | — | — |
| J | 0.048 | 0.02 | 0.21 | 0.026 | 0.0565 | 0.020 | 0.0067 | 0.082 | — | — | — | — | — | — | — | — | — |
| K | 0.058 | 0.01 | 0.24 | 0.036 | 0.0120 | 0.106 | 0.0017 | 0.048 | — | — | — | — | — | — | — | — | — |
| L | 0.052 | 0.01 | 0.37 | 0.012 | 0.0086 | 0.023 | 0.0034 | 0.021 | 0.025 | — | 0.019 | 0.0015 | — | — | — | — | — |
| M | 0.065 | 0.01 | 0.21 | 0.015 | 0.0085 | 0.039 | 0.0013 | 0.024 | — | — | — | — | — | — | — | — | — |
| N | 0.061 | 0.01 | 0.50 | 0.029 | 0.0117 | 0.017 | 0.0040 | 0.041 | — | — | — | — | — | 0.41 | — | 0.18 | — |
| O | 0.068 | 0.02 | 0.36 | 0.016 | 0.0118 | 0.057 | 0.0019 | 0.028 | — | — | — | — | — | — | 0.09 | — | — |
| P | 0.079 | 0.02 | 0.26 | 0.026 | 0.0100 | 0.017 | 0.0028 | 0.036 | — | — | — | — | — | — | — | 0.07 | 0.005 |
| Q | 0.044 | 0.01 | 0.26 | 0.001 | 0.0022 | 0.034 | 0.0051 | 0.003 | — | — | — | — | — | — | — | — | — |
| R | 0.040 | 0.01 | 0.21 | 0.030 | 0.0068 | 0.017 | 0.0031 | 0.037 | — | 0.039 | — | — | — | — | — | — | — |
| S | 0.067 | 0.02 | 0.24 | 0.005 | 0.0143 | 0.029 | 0.0019 | 0.020 | — | 0.035 | — | — | — | — | — | — | — |
| T | 0.050 | 0.01 | 0.29 | 0.011 | 0.0380 | 0.038 | 0.0059 | 0.049 | — | 0.049 | — | — | — | — | — | — | — |
| U | 0.071 | 0.02 | 0.35 | 0.033 | 0.0136 | 0.033 | 0.0020 | 0.046 | — | — | — | — | — | — | — | — | — |
| V | 0.048 | 0.01 | 0.23 | 0.018 | 0.0075 | 0.027 | 0.0039 | 0.025 | — | — | — | — | — | — | — | — | — |
| W | 0.059 | 0.01 | 0.35 | 0.034 | 0.0111 | 0.008 | 0.0033 | 0.045 | — | — | — | — | — | — | — | — | — |

| Steel type | Composition (mass %) | | | | | | | | | T1 temperature (° C.) | T2 temperature (° C.) | Remarks |
|---|---|---|---|---|---|---|---|---|---|---|---|---|
| | Sb | Sn | Ta | Ca | Mg | Zn | Co | Zr | REM | | | |
| A | — | — | — | — | — | — | — | — | — | 728 | 886 | Invention steel |
| B | — | — | — | — | — | — | — | — | — | 729 | 911 | Invention steel |
| C | — | — | — | — | — | — | — | — | — | 726 | 897 | Invention steel |
| D | — | — | — | — | — | — | — | — | — | 730 | 891 | Invention steel |
| E | — | — | — | — | — | — | — | — | — | 729 | 901 | Invention steel |
| F | — | — | — | — | — | — | — | — | — | 727 | 937 | Comparative steel |
| G | — | — | — | — | — | — | — | — | — | 735 | 915 | Comparative steel |
| H | — | — | — | — | — | — | — | — | — | 713 | 878 | Comparative steel |
| I | — | — | — | — | — | — | — | — | — | 728 | 916 | Comparative steel |
| J | — | — | — | — | — | — | — | — | — | 731 | 913 | Comparative steel |
| K | — | — | — | — | — | — | — | — | — | 730 | 921 | Comparative steel |
| L | — | — | — | — | — | — | — | — | — | 727 | 917 | Invention steel |
| M | — | — | — | — | — | — | — | — | — | 731 | 908 | Invention steel |
| N | — | — | — | — | — | — | — | — | — | 732 | 899 | Invention steel |
| O | 0.005 | — | — | — | — | — | — | — | — | 728 | 906 | Invention steel |
| P | — | 0.005 | — | — | — | — | — | — | — | 730 | 898 | Invention steel |
| Q | — | — | 0.005 | — | — | — | — | — | — | 730 | 915 | Invention steel |
| R | 0.006 | — | — | — | — | — | — | — | — | 731 | 916 | Invention steel |
| S | — | 0.004 | — | — | — | — | — | — | — | 730 | 905 | Invention steel |
| T | — | — | 0.006 | — | — | — | — | — | — | 729 | 912 | Invention steel |
| U | — | — | — | 0.0028 | — | — | — | 0.004 | — | 728 | 901 | Invention steel |
| V | — | — | — | — | 0.0041 | 0.009 | 0.005 | — | — | 730 | 913 | Invention steel |
| W | — | — | — | — | — | — | — | — | 0.0031 | 728 | 902 | Invention steel |

TABLE 2

| No. | Steel type | Finish-rolling inlet temperature (° C.) | Pass immediately before final pass (%) | Final pass (%) | Finish-rolling delivery temperature (° C.) | Average cooling rate from after finish rolling to coiling temperature (° C.) | Coiling temperature (° C.) | Rolling reduction in cold-rolling (%) | $R_{F-1}$ (%) | $R_{F-2}$ (%) | $R_{F-3}$ (%) | $|R_{F-1} - R_{F-2}|$ (%) |
|---|---|---|---|---|---|---|---|---|---|---|---|---|
| 1 | A | 1060 | 20 | 10 | 870 | 35 | 680 | 70 | 31 | 25 | 22 | 6 |
| 2 | B | 1050 | 22 | 11 | 880 | 28 | 660 | 73 | 31 | 26 | 21 | 5 |
| 3 | C | 1040 | 20 | 10 | 890 | 13 | 630 | 70 | 30 | 24 | 21 | 6 |
| 4 | C | 980 | 21 | 11 | 910 | 23 | 630 | 71 | 29 | 23 | 20 | 6 |

TABLE 2-continued

| No. | | | | | | | | | | | | |
|---|---|---|---|---|---|---|---|---|---|---|---|---|
| 5 | C | 1110 | 18 | 3 | 890 | 19 | 600 | 64 | 29 | 24 | 19 | 5 |
| 6 | C | 1020 | 20 | 12 | 770 | 15 | 590 | 70 | 31 | 28 | 22 | 3 |
| 7 | C | 1030 | 23 | 13 | 870 | 4 | 550 | 70 | 30 | 26 | 20 | 4 |
| 8 | C | 1150 | 22 | 10 | 850 | 12 | 820 | 70 | 30 | 25 | 19 | 5 |
| 9 | C | 1060 | 21 | 11 | 880 | 10 | 630 | 35 | 11 | 10 | 10 | 1 |
| 10 | C | 1050 | 22 | 10 | 910 | 18 | 610 | 75 | 37 | 28 | 20 | 9 |
| 11 | C | 1020 | 23 | 12 | 860 | 20 | 620 | 73 | 34 | 22 | 20 | 12 |
| 12 | C | 1160 | 22 | 11 | 920 | 22 | 700 | 65 | 29 | 24 | 19 | 5 |
| 13 | C | 1030 | 19 | 10 | 910 | 25 | 610 | 75 | 30 | 25 | 20 | 5 |
| 14 | C | 1150 | 22 | 13 | 900 | 15 | 600 | 75 | 31 | 24 | 22 | 7 |
| 15 | C | 1060 | 19 | 12 | 880 | 21 | 650 | 75 | 30 | 25 | 21 | 5 |
| 16 | C | 1050 | 23 | 12 | 880 | 16 | 650 | 75 | 31 | 28 | 19 | 3 |
| 17 | C | 1040 | 20 | 11 | 890 | 13 | 700 | 80 | 32 | 26 | 20 | 6 |
| 18 | D | 1060 | 21 | 11 | 900 | 23 | 680 | 95 | 34 | 24 | 22 | 10 |
| 19 | E | 1040 | 20 | 10 | 890 | 26 | 690 | 90 | 33 | 28 | 20 | 5 |
| 20 | F | 1160 | 23 | 10 | 940 | 25 | 570 | 80 | 32 | 25 | 21 | 7 |
| 21 | G | 1050 | 23 | 10 | 860 | 45 | 590 | 80 | 32 | 28 | 19 | 4 |
| 22 | H | 1060 | 22 | 13 | 890 | 21 | 720 | 75 | 31 | 24 | 22 | 7 |
| 23 | I | 1060 | 19 | 11 | 880 | 19 | 640 | 65 | 27 | 25 | 20 | 2 |
| 24 | J | 1150 | 23 | 12 | 860 | 32 | 690 | 65 | 28 | 25 | 20 | 3 |
| 25 | K | 1160 | 19 | 13 | 860 | 34 | 600 | 65 | 27 | 26 | 21 | 1 |
| 26 | L | 1040 | 23 | 13 | 920 | 18 | 610 | 65 | 28 | 25 | 22 | 3 |
| 27 | M | 1060 | 21 | 11 | 910 | 20 | 700 | 72 | 31 | 24 | 19 | 7 |
| 28 | N | 1050 | 19 | 12 | 880 | 21 | 660 | 68 | 30 | 25 | 22 | 5 |
| 29 | O | 1060 | 23 | 12 | 859 | 10 | 600 | 75 | 30 | 28 | 20 | 2 |
| 30 | P | 1030 | 22 | 13 | 910 | 14 | 570 | 75 | 29 | 24 | 21 | 5 |
| 31 | Q | 1160 | 22 | 11 | 890 | 18 | 640 | 75 | 30 | 26 | 22 | 4 |
| 32 | R | 1050 | 21 | 10 | 850 | 19 | 600 | 75 | 29 | 25 | 19 | 4 |
| 33 | S | 1060 | 20 | 11 | 840 | 11 | 620 | 58 | 22 | 21 | 21 | 1 |
| 34 | T | 1040 | 22 | 10 | 900 | 17 | 530 | 65 | 28 | 28 | 22 | 0 |
| 35 | U | 1150 | 20 | 10 | 890 | 8 | 630 | 70 | 29 | 24 | 21 | 5 |
| 36 | V | 1030 | 23 | 13 | 820 | 14 | 670 | 70 | 30 | 25 | 21 | 5 |
| 37 | W | 1060 | 22 | 9 | 870 | 18 | 630 | 70 | 29 | 24 | 22 | 5 |

| | | Annealing conditions | | | | | | | |
|---|---|---|---|---|---|---|---|---|---|
| No. | $\|R_{F\text{-}2} - R_{F\text{-}3}\|$ (%) | Annealing method(*) (CAL or BAF) | Dew point *1 (° C.) | Average heating rate *2 (° C./s) | Annealing temperature (° C.) | Whether water cooling is performed | Overaging temperature (° C.) | Presence of coating (Yes/No) | Type of coating etc. (**) | Remarks |
| 1 | 3 | CAL | −45 | 10 | 810 | Yes | 440 | No | CR | Example |
| 2 | 5 | CAL | −50 | 15 | 770 | No | 420 | Yes | GA | Example |
| 3 | 3 | CAL | −47 | 20 | 830 | Yes | 460 | Yes | GI | Example |
| 4 | 3 | CAL | −46 | 25 | 790 | No | 450 | Yes | GA | Comparative Example |
| 5 | 5 | CAL | −42 | 20 | 850 | No | 360 | No | CR | Comparative Example |
| 6 | 6 | CAL | −47 | 10 | 820 | No | 400 | Yes | EG | Comparative Example |
| 7 | 6 | CAL | −47 | 15 | 750 | No | 440 | No | CR | Comparative Example |
| 8 | 6 | CAL | −48 | 10 | 750 | Yes | 460 | Yes | GA | Comparative Example |
| 9 | 0 | CAL | −48 | 15 | 770 | No | 470 | Yes | EG | Comparative Example |
| 10 | 8 | CAL | −43 | 20 | 800 | No | 460 | Yes | GA | Comparative Example |
| 11 | 2 | CAL | −45 | 25 | 800 | No | 470 | No | CR | Comparative Example |
| 12 | 5 | CAL | −35 | 22 | 825 | No | 480 | Yes | GI | Comparative Example |
| 13 | 5 | CAL | −47 | 54 | 800 | Yes | 440 | No | CR | Comparative Example |
| 14 | 2 | CAL | −47 | 15 | 675 | No | 460 | No | CR | Comparative Example |
| 15 | 4 | CAL | −47 | 10 | 920 | No | 400 | Yes | GA | Comparative Example |
| 16 | 9 | BAF | −47 | — | 575 | — | — | Yes | GI | Comparative Example |
| 17 | 6 | CAL | −47 | 15 | 800 | No | 250 | Yes | GA | Comparative Example |
| 18 | 2 | CAL | −50 | 20 | 750 | No | 400 | Yes | GA | Example |
| 19 | 8 | CAL | −48 | 15 | 800 | No | 420 | Yes | GA | Example |
| 20 | 4 | CAL | −47 | 15 | 780 | Yes | 400 | Yes | GA | Comparative Example |
| 21 | 9 | CAL | −47 | 15 | 750 | No | 420 | No | CR | Comparative Example |
| 22 | 2 | CAL | −49 | 20 | 780 | No | 440 | Yes | GI | Comparative Example |
| 23 | 5 | CAL | −48 | 20 | 760 | Yes | 400 | Yes | GI | Comparative Example |
| 24 | 5 | CAL | −47 | 15 | 750 | No | 400 | No | CR | Comparative Example |
| 25 | 5 | CAL | −40 | 10 | 760 | No | 500 | Yes | GA | Comparative Example |
| 26 | 3 | CAL | −41 | 34 | 750 | Yes | 470 | Yes | GI | Example |
| 27 | 5 | BAF | −40 | — | 750 | — | — | Yes | GI | Example |
| 28 | 3 | BAF | −42 | — | 620 | — | — | No | CR | Example |
| 29 | 8 | BAF | −42 | — | 675 | — | — | Yes | GI | Example |
| 30 | 3 | CAL | −52 | 15 | 815 | No | 400 | Yes | GA | Example |
| 31 | 4 | CAL | −50 | 2 | 750 | No | 420 | No | CR | Example |
| 32 | 6 | CAL | −51 | 10 | 770 | No | 380 | Yes | ZAM | Example |
| 33 | 0 | CAL | −50 | 15 | 750 | Yes | 400 | No | CR | Example |
| 34 | 6 | CAL | −49 | 20 | 830 | No | 440 | Yes | GA | Example |
| 35 | 3 | CAL | −40 | 15 | 800 | No | 440 | Yes | EG | Example |

TABLE 2-continued

| | | | | | | | | | | |
|---|---|---|---|---|---|---|---|---|---|---|
| 36 | 4 | CAL | −48 | 10 | 750 | Yes | 420 | Yes | GI | Example |
| 37 | 2 | CAL | −47 | 20 | 760 | No | 460 | Yes | GA | Example |

(*)CAL: continuous annealing, BAF: box annealing
(**)CR: cold-rolled steel sheet (not coated), GI: galvanized steel sheet (not subjected to galvannealing), GA: galvannealed steel sheet, EG: electrogalvanized steel sheet, ZAM: hot-dip zinc-aluminum-magnesium alloy coated steel sheet
*1: Dew point in furnace in a temperature range of 600° C. or higher
*2: Average heating rate in a temperature range of 450° C. to [T1 temperature − 10° C.]

The high-strength cold-rolled steel sheets and the high-strength coated steel sheets obtained as above were used as sample steels to evaluate their mechanical properties. The mechanical properties were evaluated by the following tensile test. The results are indicated in Table 3. The sheet thickness of the each steel sheet, which is a sample steel sheet, is also indicated in Table 3.

JIS No. 5 test pieces taken so that the longitudinal direction of the test pieces was in three directions, namely, the rolling direction (L direction) of the steel sheet, a direction (D direction) 45° with respect to the rolling direction of the steel sheet, and a direction (C direction) 90° with respect to the rolling direction of the steel sheet, were used to perform a tensile test in accordance with JIS Z 2241 (2011), and the YP (yield stress), the TS (tensile strength), and El (total elongation) were measured. YP, TS, and El indicated in Table 3 are the measurement results of the test pieces taken in the C direction. |ΔYP| was calculated by the above-described calculation method.

For the purposes of the present invention, the workability was evaluated as satisfactory when the product, TS×El (El denotes the total elongation), was 13000 MPa·% or more. The YP planar anisotropy was evaluated as satisfactory when the value of |ΔYP|, which is an index of the YP planar anisotropy, was 30 MPa or less.

The steel sheets were evaluated as having excellent surface properties when the scale defect length incidence per 100 coils was 1.2% or less. The scale defect length incidence is determined by formula (2) below, and the surface properties were observed with a surface tester and evaluated as "excellent" when the scale defect length incidence per 100 coils was 0.3% or less, "fair" when the incidence was more than 0.3% but not more than 1.2%, and "poor" when the incidence was more than 1.2%.

(Scale defect length incidence)=(total length of defects determined to be scale defects in L direction)/(delivery-side coil length)×100    (2)

According to the methods described above, the inverse intensity ratio of the γ-fiber to the α-fiber in the ferrite texture at a position ¼ of the thickness of the steel sheet, the ferrite average crystal grain size, and the proportion of the cementite present in the grain boundaries were determined.

The coatability was evaluated as satisfactory when the bare spot defect incidence per 100 coils was 0.8% or less. The coating defect length incidence is determined by formula (3) below, and the surface properties were observed with a surface tester and evaluated as "excellent" when the scale defect length incidence per 100 coils was 0.2% or less, "fair" when the incidence was more than 0.2% but not more than 0.8%, and "poor" when the incidence was more than 0.8%.

(Coating defect length incidence)=(total length of defects determined to be bare defects in L direction)/(delivery-side coil length)×100    (3)

The results are indicated in Table 3. As indicated in Table 3, in Examples of the present invention, TS was 340 MPa or more, the workability was excellent, the YP planar anisotropy was excellent, and the surface properties were excellent. In contrast, in Comparative Examples, at least one of the strength, the balance between strength and ductility, the YP planar anisotropy, and the scale-induced defects contamination ratio per 50 coils was not satisfactory.

Although the embodiments of the present invention are described heretofore, the present invention is not limited by the description of the embodiments, which constitutes part of the disclosure of the present invention. In other words, other embodiments, examples, and implementation techniques practiced by a person skilled in the art and the like on the basis of the embodiments are all within the scope of the present invention. For example, in a series of heat treatments in the production methods described above, the facilities in which the steel sheet is heat-treated and the like are not particularly limited as long as the heat history conditions are satisfied.

TABLE 3

| No. | Steel type | F average crystal grain size (μm) | Grain boundary percentage of precipitated θ (%) | γ-Fiber-to-α-fiber inverse intensity ratio in F. | YP (MPa) | TS (MPa) | El (%) | TS × El (MPa · %) | |ΔYP| (MPa) | Scale defect length incidence per 100 coils (%) | Surface properties | Coatability | Remarks |
|---|---|---|---|---|---|---|---|---|---|---|---|---|---|
| 1 | A | 8.4 | 88 | 4.1 | 241 | 383 | 39.3 | 15052 | 19 | 0.1 | Excellent | — | Example |
| 2 | B | 15.9 | 79 | 3.5 | 264 | 370 | 38.9 | 14393 | 6 | 0.0 | Excellent | Fair | Example |
| 3 | C | 17.9 | 90 | 4.2 | 208 | 366 | 41.6 | 15226 | 15 | 0.7 | Fair | Fair | Example |
| 4 | C | 18.5 | 90 | 0.7 | 265 | 372 | 37.5 | 13950 | 33 | 0.8 | Fair | Fair | Comparative Example |
| 5 | C | 27.5 | 80 | 0.6 | 190 | 335 | 44.6 | 14941 | 36 | 0.3 | Fair | Fair | Comparative Example |
| 6 | C | 18.4 | 66 | 0.7 | 214 | 371 | 30.2 | 11204 | 40 | 0.8 | Fair | Fair | Comparative Example |
| 7 | C | 18.0 | 36 | 5.2 | 251 | 357 | 32.6 | 11638 | 16 | 1.0 | Fair | — | Comparative Example |
| 8 | C | 16.0 | 37 | 2.7 | 253 | 367 | 32.6 | 11964 | 17 | 0.8 | Fair | Fair | Comparative Example |

TABLE 3-continued

| No. | Steel type | F average crystal grain size (μm) | Grain boundary percentage of precipitated θ (%) | γ-Fiber-to-α-fiber inverse intensity ratio in F. | YP (MPa) | TS (MPa) | EI (%) | TS × EI (MPa · %) | \|ΔYP\| (MPa) | Scale defect length incidence per 100 coils (%) | Surface properties | Coatability | Remarks |
|---|---|---|---|---|---|---|---|---|---|---|---|---|---|
| 9 | C | 16.2 | 35 | 0.6 | 206 | 373 | 43.8 | 16337 | 36 | 0.8 | Fair | Fair | Comparative Example |
| 10 | C | 4.2 | 38 | 3.2 | 253 | 393 | 28.7 | 11279 | 20 | 0.2 | Excellent | Fair | Comparative Example |
| 11 | C | 20.5 | 85 | 0.7 | 280 | 381 | 39.5 | 15050 | 35 | 0.5 | Fair | — | Comparative Example |
| 12 | C | 24.2 | 89 | 4.6 | 217 | 305 | 49.5 | 15098 | 19 | 1.0 | Fair | Fair | Comparative Example |
| 13 | C | 3.7 | 75 | 0.6 | 293 | 376 | 32.3 | 12145 | 36 | 0.8 | Fair | — | Comparative Example |
| 14 | C | 8.1 | 80 | 0.7 | 296 | 381 | 33.0 | 12573 | 36 | 0.6 | Fair | — | Comparative Example |
| 15 | C | 19.4 | 67 | 0.6 | 202 | 366 | 41.8 | 15299 | 35 | 1.1 | Poor | Fair | Comparative Example |
| 16 | C | 9.2 | 69 | 0.7 | 283 | 387 | 29.8 | 11533 | 39 | 0.5 | Fair | Excellent | Comparative Example |
| 17 | C | 19.3 | 34 | 3.8 | 207 | 369 | 30.6 | 11291 | 9 | 0.5 | Fair | Excellent | Comparative Example |
| 18 | D | 9.6 | 72 | 4.2 | 271 | 380 | 41.8 | 15884 | 13 | 0.2 | Excellent | Excellent | Example |
| 19 | E | 21.1 | 66 | 4.8 | 207 | 371 | 43.3 | 16064 | 10 | 0.3 | Excellent | Fair | Example |
| 20 | F | 24.7 | 85 | 5.3 | 184 | 321 | 48.1 | 15440 | 12 | 0.5 | Fair | Excellent | Comparative Example |
| 21 | G | 21.5 | 36 | 2.5 | 213 | 351 | 36.4 | 12776 | 20 | 1.8 | Poor | — | Comparative Example |
| 22 | H | 15.5 | 35 | 3.1 | 215 | 352 | 32.9 | 11581 | 20 | 0.1 | Excellent | Fair | Comparative Example |
| 23 | I | 24.4 | 34 | 3.7 | 242 | 345 | 34.5 | 11903 | 7 | 0.1 | Excellent | Fair | Comparative Example |
| 24 | J | 3.1 | 62 | 4.1 | 266 | 379 | 31.0 | 11749 | 17 | 0.2 | Excellent | — | Comparative Example |
| 25 | K | 4.4 | 62 | 3.3 | 263 | 383 | 32.6 | 12486 | 18 | 0.1 | Excellent | Fair | Comparative Example |
| 26 | L | 10.6 | 75 | 2.7 | 246 | 381 | 40.5 | 15431 | 7 | 0.0 | Excellent | Excellent | Example |
| 27 | M | 21.8 | 76 | 2.9 | 207 | 358 | 42.1 | 15072 | 13 | 0.2 | Excellent | Excellent | Example |
| 28 | N | 8.0 | 82 | 4.3 | 252 | 384 | 41.7 | 16013 | 20 | 0.2 | Excellent | — | Example |
| 29 | O | 13.8 | 65 | 2.6 | 246 | 385 | 41.5 | 15978 | 7 | 0.2 | Excellent | Excellent | Example |
| 30 | P | 12.2 | 70 | 5.5 | 272 | 386 | 42.2 | 16289 | 14 | 0.0 | Excellent | Fair | Example |
| 31 | Q | 10.8 | 85 | 2.9 | 253 | 387 | 38.5 | 14900 | 13 | 0.8 | Fair | — | Example |
| 32 | R | 8.3 | 73 | 2.7 | 252 | 386 | 37.2 | 14359 | 15 | 0.1 | Excellent | Fair | Example |
| 33 | S | 8.5 | 89 | 4.2 | 244 | 389 | 37.4 | 14549 | 17 | 0.1 | Excellent | — | Example |
| 34 | T | 12.7 | 72 | 3.0 | 253 | 384 | 42.0 | 16128 | 17 | 0.1 | Excellent | Excellent | Example |
| 35 | U | 12.2 | 71 | 4.3 | 264 | 388 | 37.2 | 14434 | 18 | 0.0 | Excellent | Fair | Example |
| 36 | V | 9.1 | 89 | 2.6 | 255 | 383 | 41.9 | 16048 | 6 | 0.1 | Excellent | Excellent | Example |
| 37 | W | 11.9 | 84 | 4.3 | 236 | 385 | 36.8 | 14168 | 19 | 0.1 | Excellent | Fair | Example |

F: ferrite,
θ: cementite

According to embodiments of the present invention, a steel sheet that has a TS of 340 MPa or more, excellent workability, excellent YP planar anisotropy, and excellent surface properties, and the like can be produced. Moreover, when the steel sheet and the like obtained according to the production method of the present invention are applied to, for example, automobile structural elements, fuel efficiency can be improved through car body weight reduction, and thus the present invention offers considerable industrial advantages.

What is claimed:
1. A method for producing a hot-rolled steel sheet, the method comprising heating a steel slab having a composition containing, in terms of mass %,
C: 0.010% or more and 0.150% or less,
Si: 0.20% or less,
Mn: 1.00% or less,
P: 0.100% or less,
S: 0.0500% or less,
Al: 0.001% or more and 0.100% or less,
N: 0.0100% or less, and
the balance being Fe and unavoidable impurities, in which 0.002%≤[% P]+[% S]≤0.070% ([% M] denotes a content (mass %) of M element in steel) is satisfied;
rough-rolling the heated steel slab; in subsequent finish rolling, hot-rolling the rough-rolled steel slab under conditions of a finish-rolling inlet temperature of 1020° C. or higher and 1180° C. or lower, a rolling reduction in a final pass of the finish rolling of 5% or more and 15% or less, a rolling reduction in a pass before the final pass of 15% or more and 25% or less, and a finish-rolling delivery temperature of 800° C. or higher and 1000° C. or lower; after the hot rolling, cooling the hot-rolled sheet to a coiling temperature at an average cooling rate of 5° C./s or more and 90° C./s or less; and coiling the cooled sheet at a coiling temperature of 400° C. or higher and 800° C. or lower.

2. The method for producing a hot-rolled steel sheet according to claim 1, wherein the composition further contains, in terms of mass %, at least one element selected from:

Ti: 0.001% or more and 0.100% or less,
Nb: 0.001% or more and 0.100% or less,
V: 0.001% or more and 0.100% or less,
B: 0.0001% or more and 0.0050% or less,
Cr: 0.01% or more and 1.00% or less,
Mo: 0.01% or more and 0.50% or less,
Cu: 0.01% or more and 1.00% or less,
Ni: 0.01% or more and 1.00% or less,
As: 0.001% or more and 0.500% or less,
Sb: 0.001% or more and 0.200% or less,
Sn: 0.001% or more and 0.200% or less,
Ta: 0.001% or more and 0.100% or less,
Ca: 0.0001% or more and 0.0200% or less,
Mg: 0.0001% or more and 0.0200% or less,
Zn: 0.001% or more and 0.020% or less,
Co: 0.001% or more and 0.020% or less,
Zr: 0.001% or more and 0.020% or less, and
REM: 0.0001% or more and 0.0200% or less.

3. A method for producing a cold-rolled full hard steel sheet, the method comprising pickling a hot-rolled steel sheet obtained in the method according to claim 1; and performing cold-rolling at a rolling reduction of 55% or more, wherein, when a rolling reduction in a final pass of cold rolling is assumed to be $R_F$ and rolling reductions one stand, two stands, and three stands before the final pass are respectively assumed to be $R_{F-1}$, and $R_{F-2}$, and $R_{F-3}$, the rolling reductions $R_{F-1}$, and $R_{F-2}$, and $R_{F-3}$, are each set to 10% or more and 35% or less, a difference ($|R_{F-1}-R_{F-2}|$) between the rolling reduction one stand before the final pass and the rolling reduction two stands before the final pass is set to 10% or less, and a difference ($|R_{F-2}-R_{F-3}|$) between the rolling reduction two stands before the final pass and the rolling reduction three stands before the final pass is set to 10% or less.

4. A method for producing a cold-rolled full hard steel sheet, the method comprising pickling a hot-rolled steel sheet obtained in the method according to claim 2; and performing cold-rolling at a rolling reduction of 55% or more, wherein, when a rolling reduction in a final pass of cold rolling is assumed to be $R_F$ and rolling reductions one stand, two stands, and three stands before the final pass are respectively assumed to be $R_{F-1}$, and $R_{F-2}$, and $R_{F-3}$, the rolling reductions $R_{F-1}$, and $R_{F-2}$, and $R_{F-3}$, are each set to 10% or more and 35% or less, a difference ($|R_{F-1}-R_{F-2}|$) between the rolling reduction one stand before the final pass and the rolling reduction two stands before the final pass is set to 10% or less, and a difference ($|R_{F-2}-R_{F-3}|$) between the rolling reduction two stands before the final pass and the rolling reduction three stands before the final pass is set to 10% or less.

\* \* \* \* \*